United States Patent
Hobson, Jr.

(10) Patent No.: US 7,143,662 B2
(45) Date of Patent: Dec. 5, 2006

(54) MOTORCYCLE CRUISER BARS

(76) Inventor: Claud Hobson, Jr., 68620 66th Ave., Watervliet, MI (US) 49098

( * ) Notice: Subject to any disclaimer, the term of this patent is extended or adjusted under 35 U.S.C. 154(b) by 0 days.

(21) Appl. No.: 11/131,506

(22) Filed: May 18, 2005

(65) Prior Publication Data

US 2005/0257641 A1    Nov. 24, 2005

Related U.S. Application Data

(60) Provisional application No. 60/572,793, filed on May 19, 2004.

(51) Int. Cl.
*B62K 21/16* (2006.01)
*B62K 21/12* (2006.01)

(52) U.S. Cl. .................................. 74/551.3; 74/551.8

(58) Field of Classification Search ............... 74/551.1, 74/551.3–551.9, 547, 544, 557; 280/279, 280/280, 288.4; 180/219
See application file for complete search history.

(56) References Cited

U.S. PATENT DOCUMENTS

| | | | |
|---|---|---|---|
| 587,626 A | 8/1897 | Vollmer | |
| 594,991 A | 12/1897 | Gilbert | |
| 1,448,921 A | 3/1923 | Ershkowitz | |
| 3,289,493 A | 12/1966 | Church | 74/551.8 |
| 3,481,218 A | 12/1969 | Yoshikawa | 74/551.3 |
| 3,937,629 A | 2/1976 | Hamasaka | 74/551.8 |
| D239,011 S | 3/1976 | Hamasaka | D12/178 |
| 3,986,428 A * | 10/1976 | Ledford et al. | 411/530 |
| 4,023,436 A * | 5/1977 | Dodge | 74/551.3 |
| 4,056,268 A | 11/1977 | Connor et al. | 273/118 R |
| D263,293 S | 3/1982 | Janson | D12/178 |
| 4,630,703 A * | 12/1986 | Fletcher | 180/219 |
| 5,195,394 A * | 3/1993 | Latta | 74/551.8 |
| 5,315,895 A * | 5/1994 | Kattus et al. | 74/551.8 |
| 5,429,013 A | 7/1995 | Taylor et al. | 74/551.1 |
| 5,685,201 A * | 11/1997 | Renshaw | 74/551.2 |
| 6,003,405 A | 12/1999 | Giard | 74/551.3 |
| 6,098,493 A | 8/2000 | Cortes | 74/551.8 |
| 6,234,043 B1 * | 5/2001 | Marshall | 74/551.8 |
| 6,244,131 B1 * | 6/2001 | Liao | 74/551.3 |
| 6,748,821 B1 * | 6/2004 | Smith | 74/551.3 |
| 2005/0001404 A1 * | 1/2005 | Mihelic | 280/278 |

FOREIGN PATENT DOCUMENTS

| | | |
|---|---|---|
| DE | 3908064 A1 * | 10/1989 |
| DE | 42 23 317 A1 | 1/1993 |
| EP | 0345410 A1 * | 12/1989 |

* cited by examiner

*Primary Examiner*—Richard Ridley
*Assistant Examiner*—James Pilkington
(74) *Attorney, Agent, or Firm*—Robert L. Judd

(57) ABSTRACT

Cruiser bars for motorcycle handlebars comprising right and left cruiser bars pivotally mounted to the motorcycle handlebars for movement in a plane between extended and folded positions at one end and having a handgrip on the opposite end. A connector bar can connect the right and left cruiser bars between the mounting brackets and the handgrips when the cruiser bars are in the extended position. In the folded position the rider can operate the motorcycle using the handlebars without interference from the folded cruiser bars. In the extended position the rider can lean back and comfortably operate the motorcycle. The handgrip on the cruiser bars can include at least one auxiliary control for the motorcycle. The cruiser bars can be adjustable in length and spacing. The cruiser bars can have an integral connector.

12 Claims, 8 Drawing Sheets

MOTORCYCLE CRUISER BARS

CROSS-REFERENCE TO RELATED APPLICATIONS

This non-provisional application claims the benefit of provisional application No. 60/572,793 filed on May 19, 2004.

BACKGROUND OF THE INVENTION

1. Field of the Invention

The invention generally relates to improvements in two-wheeled vehicles such as motorcycles and the like by providing foldable cruiser bars which permit a rider to sit back on the seat and still control the vehicle.

2. Prior Art

Motorcycles and the like generally employ a pair of handlebars that the rider grips and turns to control the direction of the travel and operation of the motorcycle. It can be tiring to lean forward or sit upright or hunch over the handlebars in order to steer the motorcycle, particularly on long trips.

SUMMARY OF THE INVENTION

According to one aspect of the invention cruiser bars can be provided for motorcycle handlebars comprising right and left cruiser bars pivotally mounted to the motorcycle handlebars for movement in a plane between extended and folded positions at one end and having a handgrip on the opposite end. The cruiser bars can include a connector bar connecting the right and left cruiser bars between the mounting brackets and the handgrips in the extended position.

The pivotal mounting can include a clamp attached to the handlebars having a first hinge element and the cruiser bars can include a second hinge element at the opposite the handgrips. The cruiser bars can include an end bracket including the second hinge element at the end opposite the handgrip. The first hinge element and second hinge element can comprise holes for a hinge pin and the cruiser bars can include hinge pins pivotally connecting the first and second hinge elements.

The end brackets can be pivotally attached to the ends of the right and left cruiser bars and the first hinge element can be pivotally attached to the clamp by a swivel connection.

The connector bar can have a right and left end including a connector element and the right and left cruiser bars can have a connector bar tab arranged for receiving the connector element when the cruiser bars are in the extended position.

In another aspect of the invention at least one of the handgrips can include an auxiliary control for the motorcycle.

In another aspect of the invention the length of the right and left cruiser bars can be adjustable. The right and left cruiser bars can comprise telescoping tubes arranged to be positioned in a desired extension.

In another aspect of the invention the length of the right and left cruiser bars include handgrips having inwardly and outwardly extending portions. The inwardly extending portions can form the connector bar. The inwardly extending portions can include a connector at the inward end for connecting the cruiser bars in the extended position.

DESCRIPTION OF THE INVENTION

Figure 1:
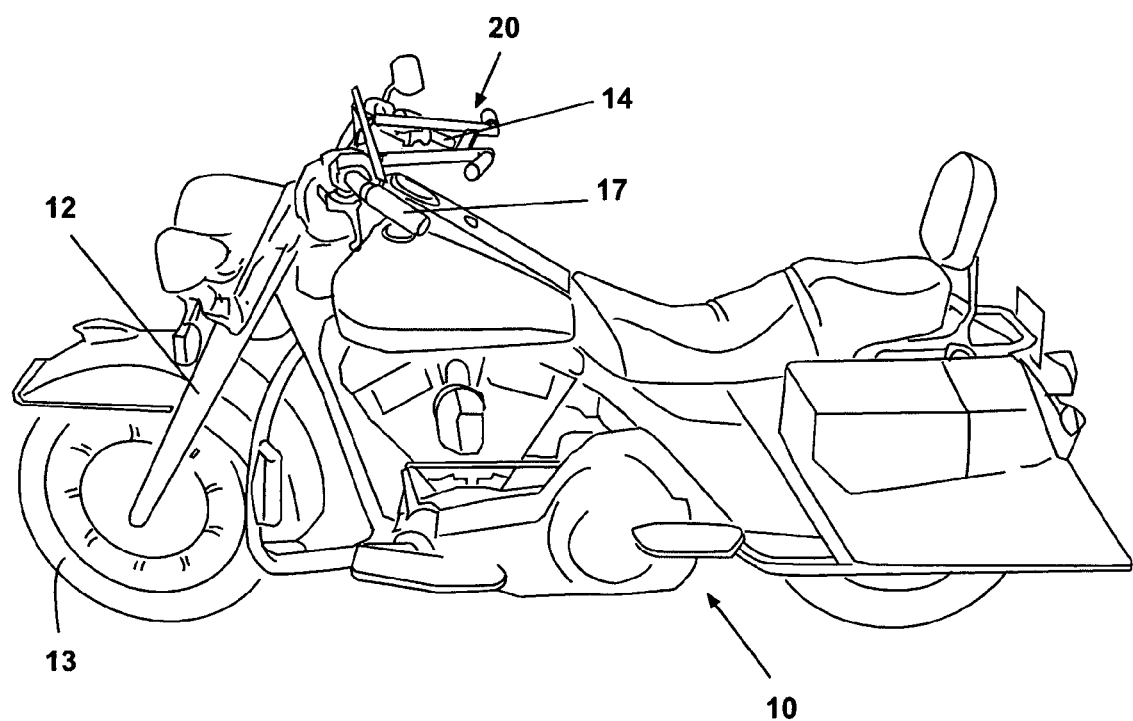
FIG. 1 is a side view of a motorcycle with one embodiment of cruiser bars according to the invention shown in the extended position.
Figure 2:
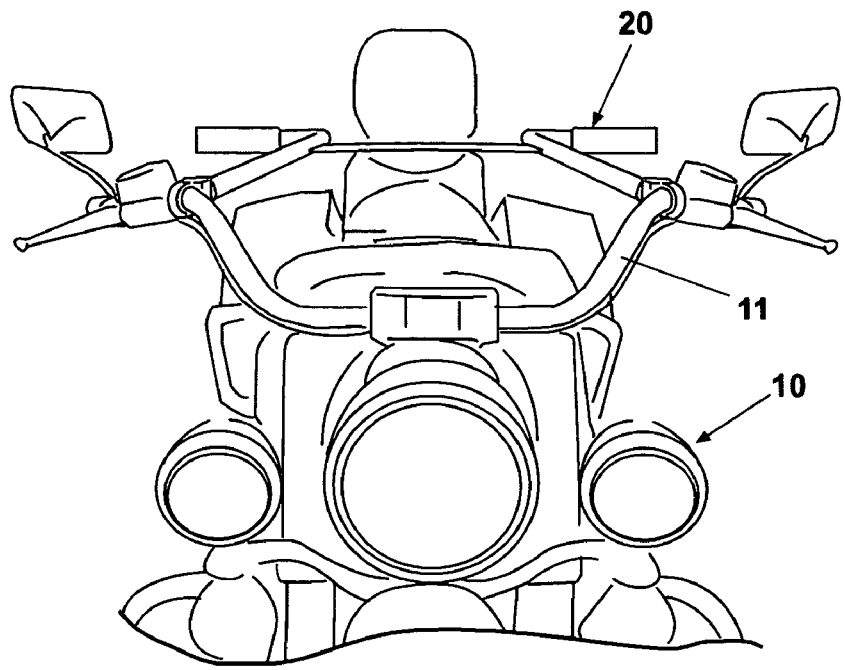
FIG. 2 is a partial front view of the motorcycle of FIG. 1.
Figure 3:
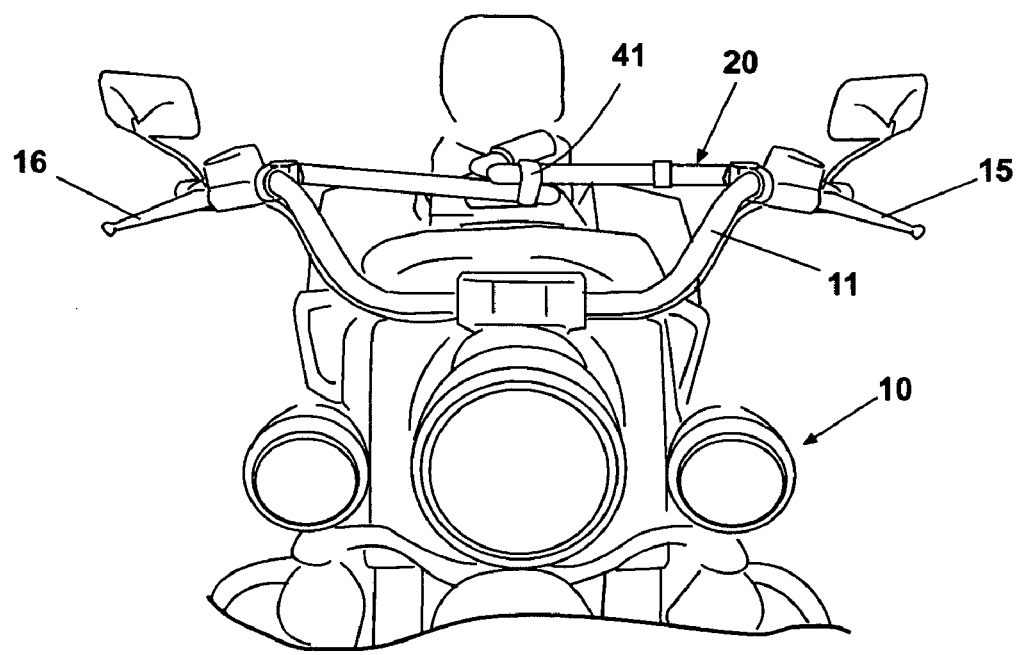
FIG. 3 is a partial front view of the motorcycle of FIG. 1 with the cruiser bars in the folded position.

According to the invention cruiser bars can be provided for a motorcycle to allow an operator to lean back against a backrest when cruising on a highway or the like by extending the handgrips toward the rider. The cruiser bars according to the invention can be folded forward to the handlebars when the rider wishes to use the conventional handlebars. Turning to FIG. 1–FIG. 3, motorcycle 10 can be seen with cruiser bars 20 according to the invention in the extended position. Motorcycle 10 can have conventional handlebars 11 attached to front fork 12 for controlling front wheel 13 as is well known in the art. Front fork 12 can carry headlights and turn signal lights as is well known in the art. Also, handlebars 11 can carry throttle 14, clutch 15 and brake 16 controls adjacent the handgrips 17 again as well known in the art. Turning to FIG. 3 cruiser bars 20 can be seen folded and secured in a forward position for operation of the motorcycle using the conventional handlebars 11.

Figure 4:
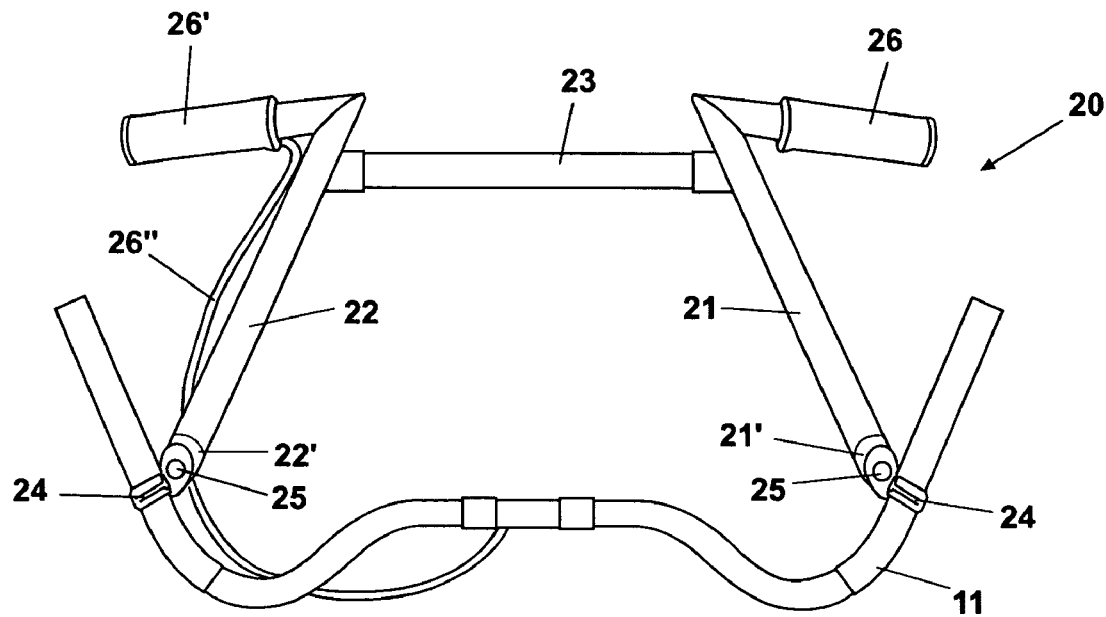
FIG. 4 is a top view showing the cruiser bars and handlebars of the motorcycle of FIG. 1 removed from the motorcycle with the cruiser bars in the extended position.
Figure 5:
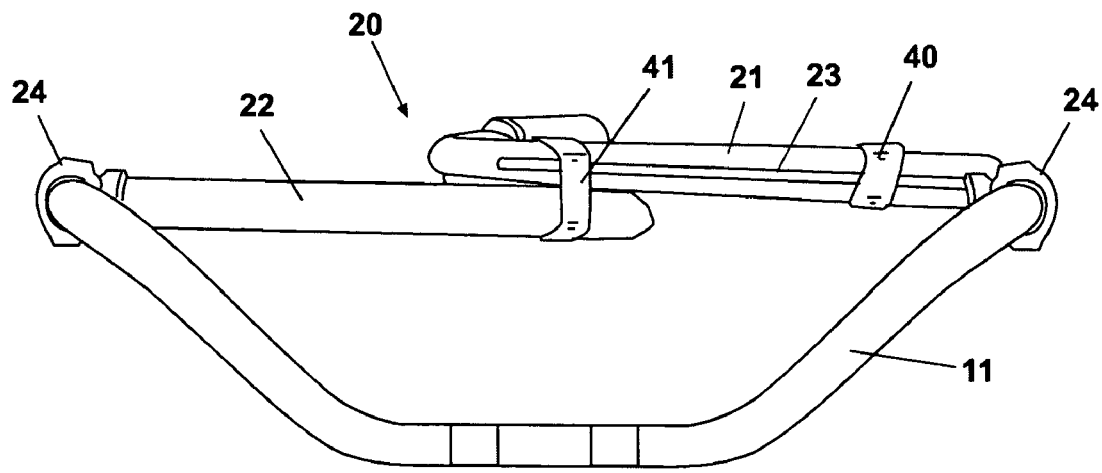
FIG. 5 is a front view showing the cruiser bars and handlebars of the motorcycle of FIG. 1 removed from the motorcycle with the cruiser bars in the folded position.
Figure 6:
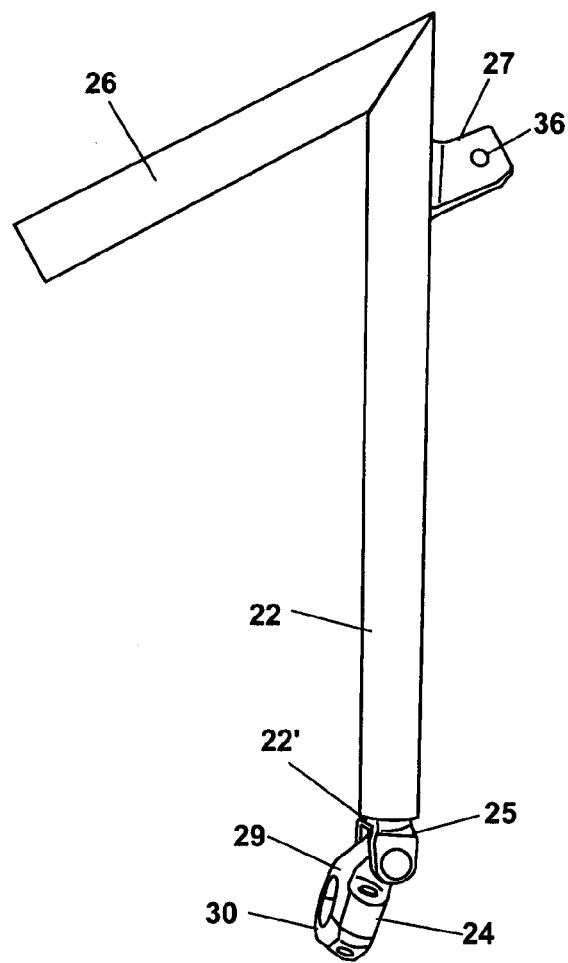
FIG. 6 is a top view of the right cruiser bar with the clamp and end bracket attached.
Figure 7:
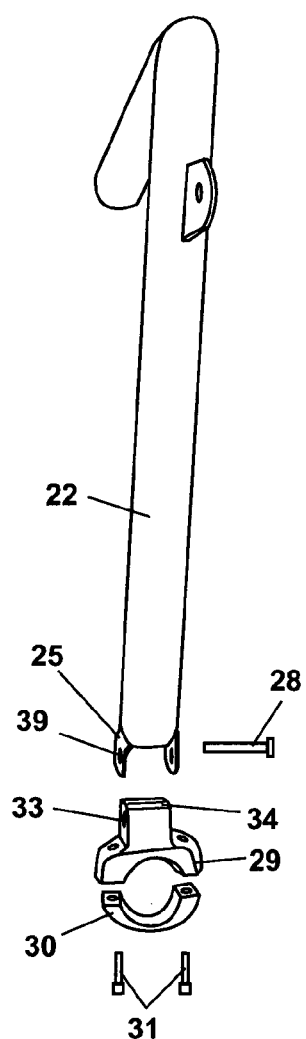
FIG. 7 is an exploded side view of the right cruiser bar of FIG. 6.
Figure 8:
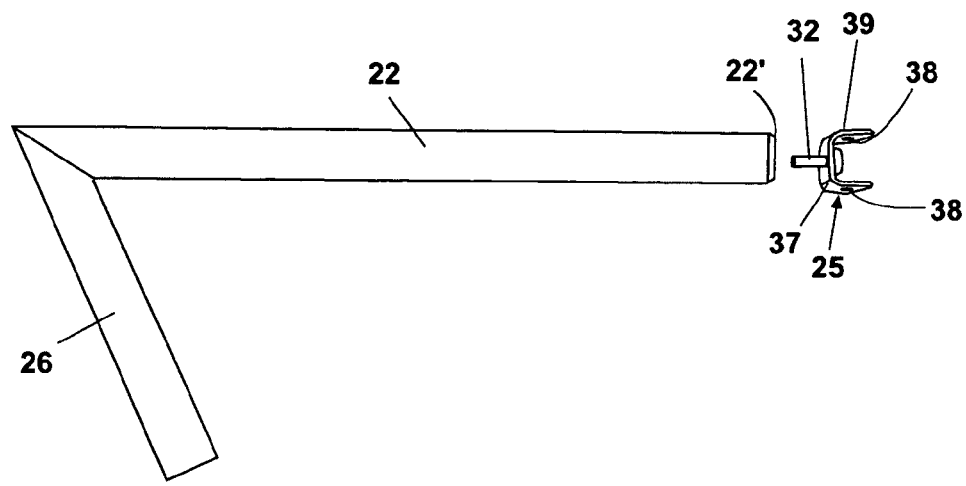
FIG. 8 is a partial exploded top view of the right cruiser bar of FIG. 6 with the clamp removed.
Figure 9:
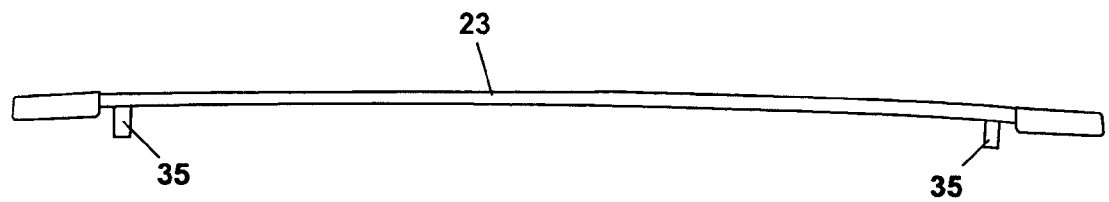
FIG. 9 is a side view of the connector bar for the cruiser bar embodiment of FIG. 1.

Turning to FIG. 4–FIG. 9, handlebars 11 can be seen removed from motorcycle 10 having one embodiment of cruiser bars 20 according to the invention attached and shown in the extended position (FIG. 4) and in the folded position (FIG. 5). Cruiser bars 20 can include a left cruiser bar 21, a right cruiser bar 22, and a connector bar 23. Cruiser bars 20 can be pivotally mounted to handlebars 11 to permit movement of the cruiser bars 20 from the extended position (FIG. 4) to a folded position (FIG. 5) with a hinge structure between the cruiser bars 20 and clamps 24 that can be used to mount the cruiser bars 20 to the handlebars 11. Left and right cruiser bars 21 and 22 can have an end bracket 25 mounted at the ends 21' and 22' of the respective cruiser bars. End bracket 25 can have a base 37 and a pair of legs 38. Legs 38 can have a hole 39 positioned to receive a hinge pin to hinge each cruiser bar to a clamp 24. As shown in FIG. 8 end bracket 25 can be mounted to the cruiser bar using a bolt 32. Those skilled in the art will understand that end bracket 25 can be rotatably or fixedly attached to the left and right cruiser bar ends 21' and 22' using a bolt 32, or other known fastener. If end brackets 25 are to be fixed to the respective cruiser bars end bracket 25 can be welded to the cruiser bar ends 21' and 22'. Cruiser bars 21 and 22 can be pivotally connected or attached to a clamp 24 with a hinge pin 28 that can pass through hole 39 in end bracket legs 38. Hinge pin 28 can be a pin with a head on one end and having a hole for a spring retaining clip or cotter pin, not shown. Those skilled in the art will readily understand that hinge pin 28 can also be a threaded fastener if desired. Clamp 24 can be a conventional handlebar clamp having a hole 33 in a hinge element 34 to receive hinge pin 28. Hinge element 34 can be formed integrally with inner clamp 29. Outer clamp 30 can be mounted to inner clamp 29 using clamp bolts 31 as is well known in the art.

Cruiser bars 20 can be positioned in the extended position by mounting connector bar 23 between the left and right cruiser bars 21 and 22 as shown in FIG. 4. Connector bar 23 can have a pin 35 projecting from the bottom side of connector bar 23 positioned to be placed in hole 36 in connector bar tabs 27 attached to the left and right cruiser bars 21 and 22. Pin 35 can have a snap connector, not shown, at the distal end of pin 35 to retain pin 35 in hole 36 in the connector bar tab 27, or can have a transverse hole at the distal end to receive a spring clip to retain pin 35 in connector bar tab 27. Alternately, pin 35 could have a threaded distal end to receive a threaded fastener to retain connector bar in place between the left and right cruiser bars 21 and 22. Alternately, connector bar 23 can have a hole through the cruiser bar in place of pins 35 to facilitate mounting of connector bar 23 to the left and right cruiser bars using pins or threaded fasteners as is well known to those skilled in the art. Similarly, connector bar 23 can be permanently pivotally connected to one cruiser bar, such as left cruiser bar 21 and removably connected to the other cruiser bar, such as right cruiser bar 22 to facilitate folding and extending the cruiser bars 20.

The left and right cruiser bars 21 and 22 can have handgrips 26 as are well known in the art. As shown in FIG. 4 the right cruiser bar 22 handgrip 26' can be an auxiliary throttle having an auxiliary throttle cable 26''. Those skilled in the art with understand that other auxiliary devices such as auxiliary switches for lights, horn, kill switch and turn signals can be mounted to cruiser bars 20 to facilitate operation of the motorcycle with the cruiser bars 20 in the extended position. Likewise auxiliary clutch and/or brake controls can be provided on the cruiser bars.

The cruiser bars 20 can be readily installed on motorcycle handlebars 11 by positioning the cruiser bars in the extended position (FIG. 1 and FIG. 4) and mounting clamps 24 to handlebars 11. Once cruiser bars 20 are in the desired position clamp bolts 32 can be tightened to secure clamps 24 in position. To move the cruiser bars to the folded position (FIG. 3 and FIG. 5) the user can disconnect one end of connector bar 23 from a cruiser bar and fold the cruiser bars forward and pivoting connector bar 23 parallel to the cruiser bar to which it remains connected. In the embodiment shown in FIG. 3 and FIG. 5 connector bar 23 remains connected to left cruiser bar 21. Cruiser bars 21 and 22 together with connector bar 23 can be secured by straps 40 and 41 that can be wrapped around the cruiser bars 21 and 22 and connector bar 23. As shown in FIG. 3 and FIG. 5 one strap 40 can be used to secure connector bar 23 to left cruiser bar 21 and strap 41 can be used to secure left cruiser bar 21 to right cruiser bar 22. Those skilled in the art will understand that straps 40 and 41 can be resilient clamps, Velcro straps, elastic bands or can be fabric or leather straps with appropriate fasteners.

Figure 10:
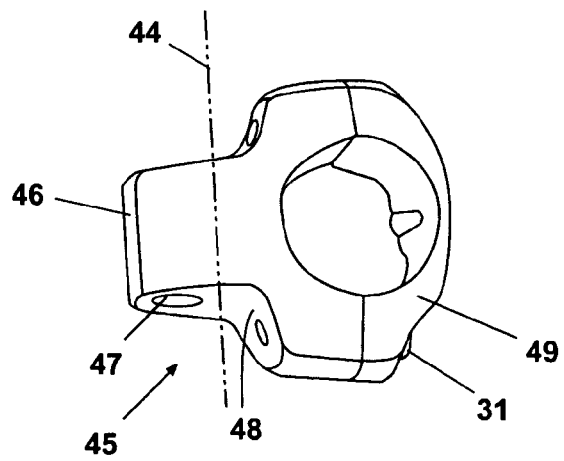
FIG. 10 is a side view of one clamp embodiment for use with cruiser bars according to the invention.

Turning to FIG. 10 a clamp embodiment incorporating a pivot between the hinge element 46 and inner clamp member can be seen. Clamp 45 can include an inner clamp 48 and outer clamp 49 that can be connected by clamp bolts 31 as is well known in the art. Hinge element 46 can be pivotally connected to inner clamp 48 at pivot plane 44 using a swivel connection, not shown. Hinge element 46 can have a hole 47 to receive a hinge pin similar to the embodiment of FIG. 4–FIG. 9. Those skilled in the art will understand that the swivel connection can be a 360° swivel, or less than a 360° swivel as are well known in the art. Use of a swivel between hinge element 46 and inner clamp 48 can facilitate installation of cruiser bars 20 on a wide variety of motorcycle handlebar styles and shapes without modifying the configuration of the cruiser bars 20. Hinge element 46 can be pivotally connected to inner clamp member 48 by a rivet, pin or bolt to form the swivel connection. Those skilled in the art will readily understand that other swivel connections can be used to connect hinge element 46 to inner clamp member 48.

Figure 11:
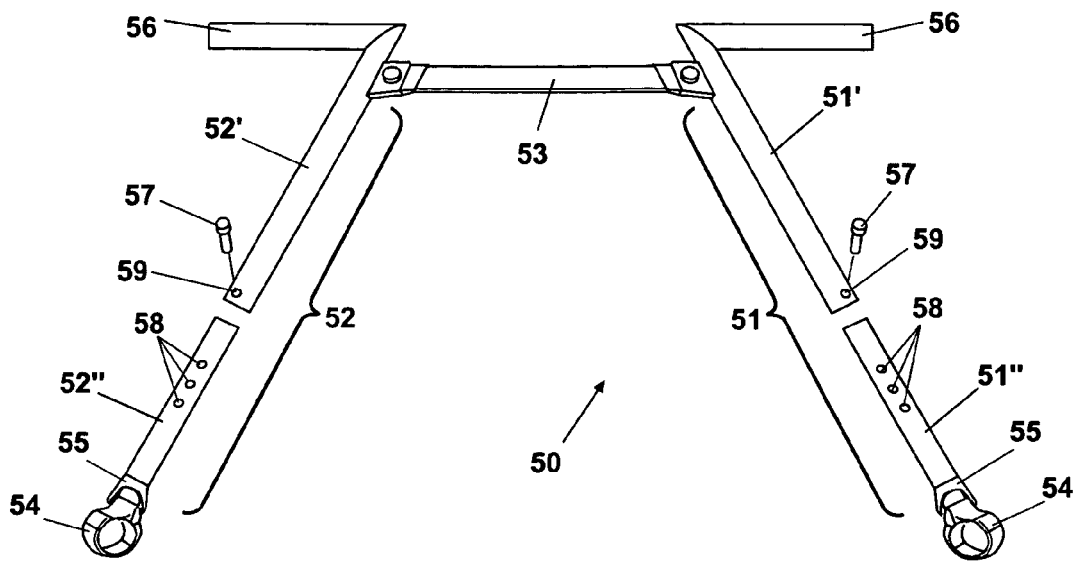
FIG. 11 is a partially exploded top view of another cruiser bars embodiment according to the invention.
Figure 12:
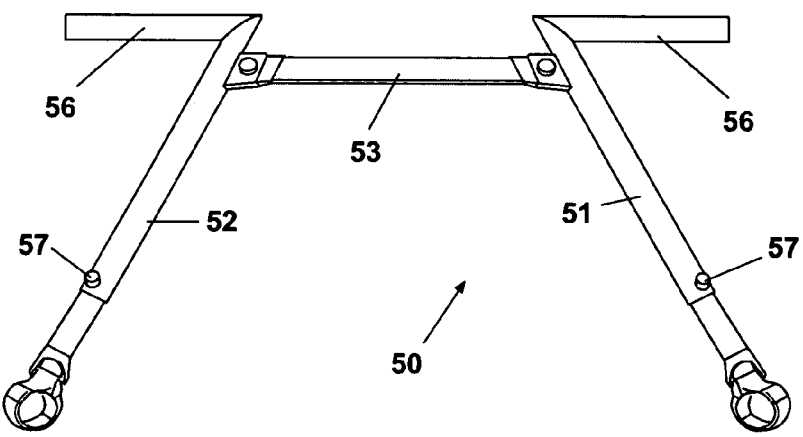
FIG. 12 is a top view of the cruiser bars embodiment of FIG. 11 showing the cruiser bars in a first position.
Figure 13:
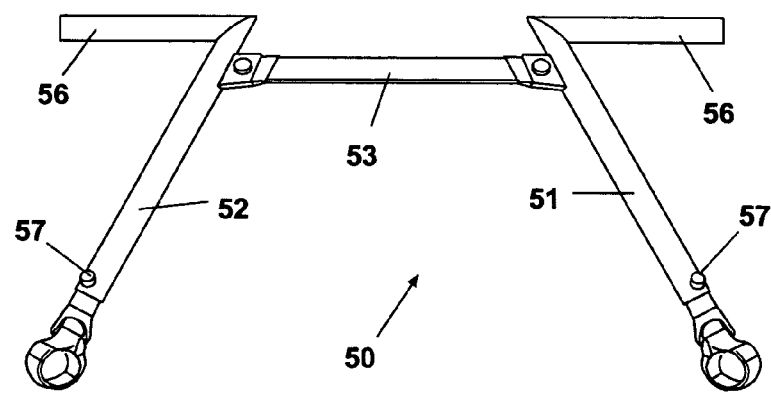
FIG. 13 is a top view of the cruiser bars embodiment of FIG. 11 showing the cruiser bars in a second position.

Turning to FIG. 11–FIG. 13 a telescoping cruiser bars embodiment can be seen. Telescoping cruiser bars can allow a user to set up cruiser bars to have a desired extension as opposed to the fixed cruiser bar extension in the embodiment of FIG. 1–FIG. 9. Telescoping cruiser bars 50 can have left and right cruiser bars 51 and 52 that can have an outer tube 51' and 52' and an inner tube 51'' and 52'' that can be sized to telescope inside the respective outer tubes 51' and 52'. Telescoping cruiser bars 50 can have a connector bar 53 that can connect the left and right cruiser bars 51 and 52 in the same manner as connector bar 23 in the embodiment of FIG. 1–FIG. 9. Left and right cruiser bars 51 and 52 can have an end bracket 55 connected to the end of inner tubes 51'' and 52'' opposite the end that telescopes into outer tubes 51' and 52'. A clamp 54 can be pivotally connected to end bracket 55 as in the embodiment of FIG. 1–FIG. 9.

Inner tubes 51'' and 52'' can include a series of holes 58 arranged to receive a pin 57 and outer tubes 51' and 52' can include hole 59 to receive pin 57 to secure inner tubes 51'' and 52'' in outer tubes 51' and 52' in one of a plurality of positions. Pin 57 can be a pin having a head formed on one end and having a hole adjacent the opposite end to receive a spring clip or cotter pin or similar fastener as are well known in the art. Alternately, a threaded fastener can be used in lieu or pin 57. A threaded fastener such as a bolt can be inserted through holes 58 and 59 and secured with a nut. Those skilled in the art will understand that a nut can be affixed to upper tubes 51' and 52' at holes 59 to receive a bolt for securing the inner tubes 51'' and 52'' in outer tubes 51' and 52'. Those skilled in the art will understand that other forms or fasteners can be used including a snap fastener. FIG. 12 shows telescoping cruiser bars 50 in a first position and FIG. 13 shows cruiser bars 50 in a second position. Those skilled in the art will understand than more than three holes 58 can be provided in inner tubes 51'' and 52'' to provide more than three positions. Likewise two holes 58 can be provided to limit the choices to two positions.

Telescoping cruiser bars 50 can include handgrips 56 like the handgrips in the embodiment of FIG. 1–FIG. 9, and those skilled in the art will understand that auxiliary controls can be provided as described above. Connector bar 53 can be connected to the left and right cruiser bars 51 and 52 as in the embodiment of FIG. 1–FIG. 9.

Figure 14:
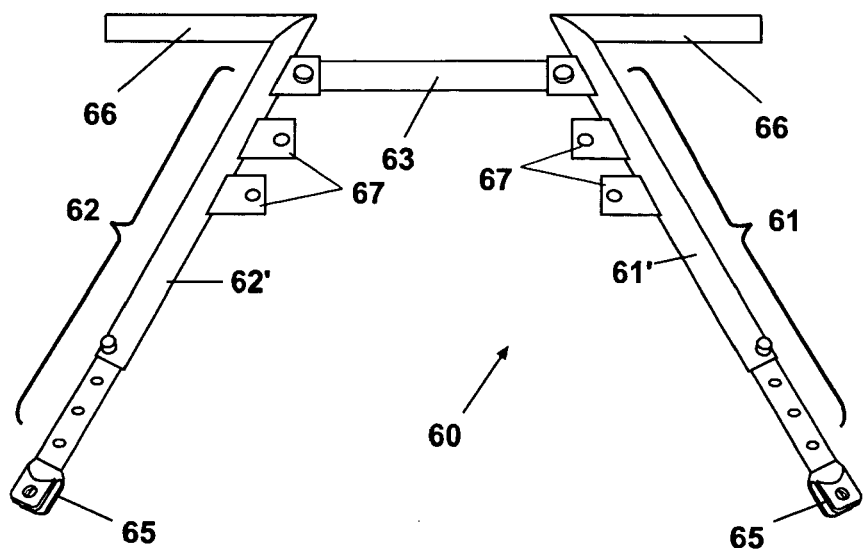
FIG. 14 is a top view of another cruiser bars embodiment according to the invention in a first position.
Figure 15:
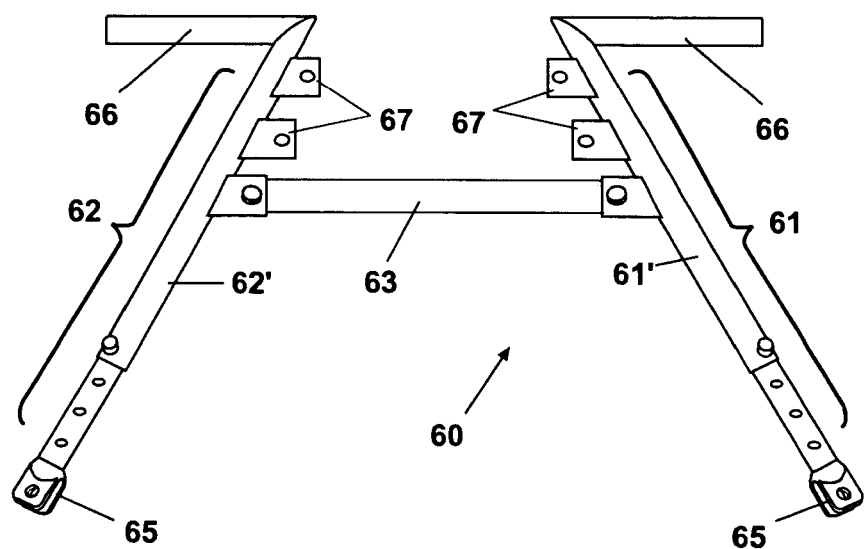
FIG. 15 is a top view of the cruiser bars embodiment of FIG. 14 showing the cruiser bars in a second position.

Turning to FIG. 14 and FIG. 15 a cruiser bar embodiment arranged to facilitate variable spacing between the cruiser bars can be seen. Cruiser bars 60 can include telescoping left and right cruiser bars 61 and 62 as described in the embodiment of FIG. 11–FIG. 13. Left and right cruiser bars 61 and 62 can have a plurality of connector bar tabs 67 spaced along outer tubes 61' and 62'. As a result of the angled configuration of cruiser bars 61 and 62, attaching connector bar 63 to different pairs of connector bar tabs 67 can vary the spacing of the cruiser bars 60 as can be seen by comparing FIG. 14 and FIG. 15. Thus, by selecting the position of connector bar 63, a user can vary the spacing of handgrips 66 to suit the user or to adapt to motorcycle handlebars, not shown, having different configurations. Cruiser bars 60 can be provided with end brackets 65 and clamps, not shown, as described above to connect the cruiser bars to a set of motorcycle handlebars. In operation, cruiser bars 60 can be assembled with connector bar 63 positioned between a pair of connector bar tabs 67 to achieve the desired handgrip 66 spacing. Clamps, not shown, can be attached to motorcycle handlebars and hinged to end brackets 65 as described above to secure the cruiser bars in the desired position. To position cruiser bars 60 with a different spacing, clamps, not shown, can be loosened and connector bar 63 repositioned to achieve the desired handgrip spacing and clamps, not shown, retightened. In operation cruiser bars 60 can be folded and extended as described above.

Figure 16:
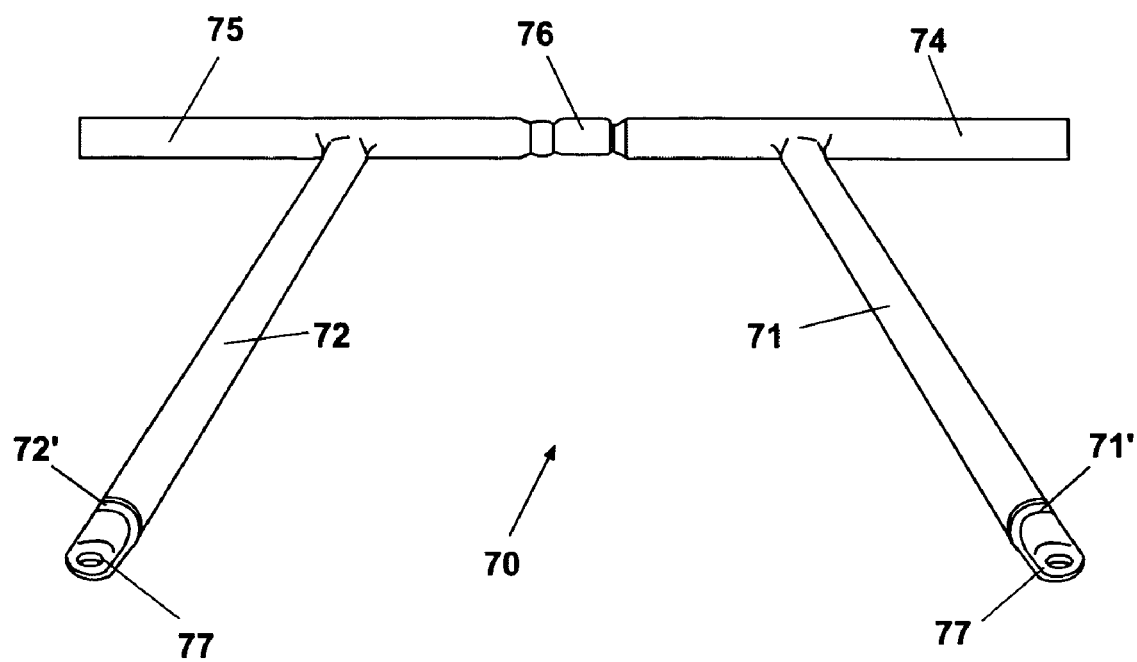
FIG. 16 is a top view of another cruiser bars embodiment according to the invention.

Turning to FIG. 16 another cruiser bar embodiment can be seen. Cruiser bars 70 can include left and right cruiser bars 71 and 72 that can include handgrips 74 and 75. Handgrips 74 and 75 can extend inwardly past cruiser bars 71 and 72 and can connect at 76 to support cruiser bars 70 in an extended position. Handgrips 74 and 75 can include a suitable connector, not shown, so that cruiser bars 71 and 72 can snap together. Cruiser bars 71 and 72 can include a hole 77 at ends 71' and 72'. Holes 77 can receive a pin or mounting bolt to secure cruiser bars 70 to clamps, not shown, for mounting the cruiser bars 70 to motorcycle handlebars. Those skilled in the art will understand that clamps similar to clamps 24 in the embodiment of FIG. 1–FIG. 9 can be used to mount cruiser bars 70 to motorcycle handlebars.

In the embodiment of FIG. 1–FIG. 9 cruiser bars 21 and 22 can be formed of 1" steel tubing. Hinge pin 28 can be a 5/16" pin, clamp 24 can be a 1" I.D. clamp and clamp bolts can be 8–32×3/4" cap screws. Connector bar 23 can be 1"×1/8" flat stock steel and pin 35 can be a 1/4" to 5/16" pin or bolt. Hole 36 in connector bar tab 27 can be a 1/4" to 5/16" diameter hole. In the embodiment of FIG. 11–FIG. 13 outer tubes 51' and 52' can be 1" steel tubing and inner tubes 51" and 52" can be 7/8" steel tubing. Pin 57 can be a 5/16" pin and holes 58 and 59 can be 5/16" holes. The cruiser bars, pins, fasteners and connector bars can be formed of stainless steel tube, or can be formed of plating steel and chrome plated. Those skilled in the art will understand that other materials and/or finishes can be used as desired including but not limited to powder coat and plastic coat finishes.

While the invention has been specifically described in connection with certain specific embodiments thereof, it is to be understood that this is by way of illustration and not of limitation, and the scope of the appended claims should be construed as broadly as the prior art will permit.

I claim:

1. A motorcycle comprising handlebars including first and second handgrips at opposite ends and auxiliary cruiser bars comprising:
    a first cruiser bar pivotally mounted to the handlebars at one end fix movement in a plane between an extended position and a folded position and having a handgrip at the opposite end of the first cruiser bar;
    a first pivotal mounting for the first cruiser bar attached to the handlebars adjacent the first handgrip including a first clamp having a first hinge element, and a second hinge element on the one end of the first cruiser bar;
    a second cruiser bar pivotally mounted to the handlebars at one end for movement in a plane between extended and folded positions and having a handgrip at the opposite end of the second cruiser bar;
    a second pivotal mounting for the second cruiser bar attached to the handlebars adjacent the second handgrip including a second clamp attached to the handlebars having a first hinge element, and a second hinge element on the one end of the second cruiser bar; and
    a rigid connector bar connecting the first and second cruiser bars at a location between the first and second ends of the first and second cruiser bars when the first and second cruiser bars are positioned in the extended position to secure the cruiser bars in the extended position;
    wherein the first and second cruiser bars are selectively movable between an extended position in which the first and second cruiser bars extend toward a rider from the handlebars, and a folded position in which the first and second cruiser bars overlap and can be secured between the first and second handgrips adjacent the handlebars.

2. The auxiliary cruiser bars according to claim 1, wherein the second hinge element of the first and second cruiser bars includes an end bracket that includes a base and a pair of legs having a hole for receiving a hinge pin.

3. The auxiliary cruiser bars according to claim 2, wherein the end brackets are respectively fixedly attached to the ends of the first and second cruiser bars.

4. The auxiliary cruiser bars according to claim 1, wherein the first hinge element of each of the first and second cruiser bars is pivotally attached to the clamp by a swivel connection having a pivot axis perpendicular to the axis of the handlebar at the clamp.

5. The auxiliary cruiser bars according to claim 1, wherein the connector bar has a first and second end including a connector element and the first and second cruiser bars each have a connector bar tab fixed to the cruiser bar between the one end and the handgrip for receiving a connector element when the cruiser bars are in the extended position.

6. The auxiliary cruiser bars according to claim 5, wherein the connector elements on the first and second ends of the connector bar are connector bar pins extending from the connector bar and the connector tabs include holes arranged to be receive the connector bar pins.

7. The cruiser bars according to claim 1, wherein the length of the first and second cruiser bars is adjustable.

8. The cruiser bars according to claim 7, wherein the first and second cruiser bars each comprise telescoping tubes arranged to be positioned in a desired extension.

9. The cruiser bars according to claim 1, wherein the first and second cruiser bars include a plurality of connector bar tabs positioned along the cruiser bars and the connector bar can be connected between respective pairs of the connector bar tabs to space the cruiser bars as desired.

10. The cruiser bars according to claim 1, wherein the first and second cruiser bars include handgrips having inwardly and outwardly extending portions at the opposite end of the cruiser bars, and the inwardly extending portions form the connector bar.

11. The cruiser bars according to claim 10, wherein the inwardly extending portions include a connector at the inward end for connecting the cruiser bars in the extended position.

12. The auxiliary cruiser bars according to claim 1, wherein the first hinge clement and second hinge element comprise holes for a hinge pin and the cruiser bars further include hinge pins pivotally connecting the first and second hinge elements of the first and second pivotal mountings.

* * * * *